(12) United States Patent
Peng

(10) Patent No.: US 7,692,826 B2
(45) Date of Patent: Apr. 6, 2010

(54) DOCUMENT FIXING APPARATUS

(76) Inventor: Wen-Yuan Peng, No.21, Lane 38, Sinmin St., Jhubei City, Hsinchu County (TW)

(*) Notice: Subject to any disclaimer, the term of this patent is extended or adjusted under 35 U.S.C. 154(b) by 1212 days.

(21) Appl. No.: 10/960,101

(22) Filed: Oct. 8, 2004

(65) Prior Publication Data

US 2006/0077477 A1    Apr. 13, 2006

(51) Int. Cl.
*H04N 1/04* (2006.01)
(52) U.S. Cl. .............. 358/497; 358/474; 358/491; 358/487
(58) Field of Classification Search .......... 358/497, 358/474, 471, 487; 399/380
See application file for complete search history.

(56) References Cited

U.S. PATENT DOCUMENTS

| 4,440,494 A | * | 4/1984 | Wells | 355/100 |
| 6,408,161 B1 | * | 6/2002 | Minowa et al. | 399/380 |
| 6,640,083 B2 | * | 10/2003 | Conard-White et al. | 399/377 |
| 6,678,077 B1 | * | 1/2004 | Huang | 358/497 |
| 7,050,206 B2 | * | 5/2006 | Payne et al. | 358/488 |

* cited by examiner

*Primary Examiner*—Houshang Safaipour
(74) *Attorney, Agent, or Firm*—Perkins Coie LLP

(57) ABSTRACT

A document fixing apparatus adopted for use on business machines with glass surfaces includes a coupling member and an anchor member. The coupling member is located on one end of the glass surface. The anchor member has one end engaged with the coupling member and corresponds to the glass surface. When the anchor member is lifted from the glass surface, a scanned document may be placed on the glass surface, and the anchor member may be moved to rest on the scanned document.

21 Claims, 5 Drawing Sheets

DOCUMENT FIXING APPARATUS

FIELD OF THE INVENTION

The invention relates to a document fixing apparatus adopted for use on business machines such as scanners and copiers.

BACKGROUND OF THE INVENTION

Administrative work in offices is closely related to business machines such as scanners and copiers. These business machines have become indispensable information equipment in the office environment today.

The following discussion is based on a scanner. When in use, first open the lid, place a scanned document on the glass surface, align the scanning position (referring to the marked lines on the borders of the glass surface), and cover the glass surface with the lid to start the scanning operation. However, when the lid is closed, a wind is often generated that may flutter and skew the scanned document resting on the glass surface, and the scanning operation or result could be negatively affected. When the lid is opened, the scanned document also may flutter.

When the lid covers the glass surface, it often compresses the scanned document with uneven force, resulting in unevenly scanned images and undesirable scanning quality.

As the content of the scanned document generally is not located on the border, aligning the scanned document often takes a number of tries and adjustments. It often happens that one adjustment cannot accurately align the scanned document as desired. A test scan has to be performed one or more times before the satisfactory scanning result (when the scanned document is aligned the scanning position) is achieved.

Moreover, each scanned document has the same dimension and must be aligned individually. Every time a new document is placed for scanning, document alignment and test scans have to be performed anew. Adjustment of the scanning position and test scans have to be done repeatedly until the satisfactory result is accomplished. All of this takes a great deal of time.

SUMMARY OF THE INVENTION

Therefore, the primary object of the invention is to provide a document fixing apparatus to anchor a scanned document on a glass surface of a scanner before the lid of the scanner covers the glass surface so that when the lid is lifted from or covers the glass surface, the scanned document does not move or flutter.

The document fixing apparatus according to the invention is adopted for use on business machines that have glass surfaces. The apparatus includes a coupling member and an anchor member. The coupling member is located on one end of the glass surface and has a neck opening on a selected location. The anchor member includes a bended side and a depressing plate. The bended side has holes corresponding to the coupling member. The depressing plate corresponds to the glass surface and may press the upper side of a scanned document. When the depressing plate is removed from the glass surface, the scanned document may be placed on the glass surface, and the depressing plate may be moved to rest on the scanned document.

The depressing plate has scanning alignment lines formed thereon to align the scanning position of the scanned document. In addition to the general grid lines, various scanning alignment lines may be formed for use on the scanned documents of different dimensions. Or specific scanning zones may be formed for scanning selected areas. The scanned document may be aligned with the specific scanning zones.

By means of the document fixing apparatus, the invention aims to achieve the following results:

1. The scanned document may be anchored on the glass surface before the lid of the scanner covers the glass surface. Hence the scanned document does not move or flutter while the lid is opened or closed over the glass surface.
2. The scanned document is compressed evenly before the lid of the scanner covers the glass surface. Hence an evenly scanned image may be obtained and a higher scanning quality may be achieved.
3. The scanned document may be positioned on the glass surface at a desired aligning location to reduce test scan time without producing a skewed image. The content of the scanned document may be aligned accurately even if it is not located on the border.
4. The depressing plate of the invention is made of a pliable and transparent gum type material, and may be easily replaced when aged or worn. Replacement is simple, convenient and inexpensive.

The foregoing, as well as additional objects, features and advantages of the invention will be more readily apparent from the following detailed description, which proceeds with reference to the accompanying drawings.

DESCRIPTION OF THE PREFERRED EMBODIMENTS

The invention aims to provide a document fixing apparatus for use on business machines such as scanners and copiers. The following discussion is based on a scanner.

The object of the apparatus of the invention is mainly to anchor a scanned document on a glass surface before the lid of the scanner covers the glass surface, so that when the lid is lifted or covers the glass surface, the scanned document does not move or flutter.

Moreover, the scanned document is evenly compressed before the lid of the scanner covers the glass surface, so that the resulting scan image is more even and an improved scanning quality may be achieved.

In addition, the scanned document may be anchored accurately on the glass surface at a desired scanning position and test scan time may be reduced. The resulting scanned image is not skewed. The content of the scanned document may be aligned accurately even if it is not located on the border.

Furthermore, the invention presses the scanned document through a depressing plate which is made of a pliable and transparent gum type material (such as plastics or rubber), and may be easily replaced when aged or worn. Replacement is simple, convenient and inexpensive.

Figure 1:
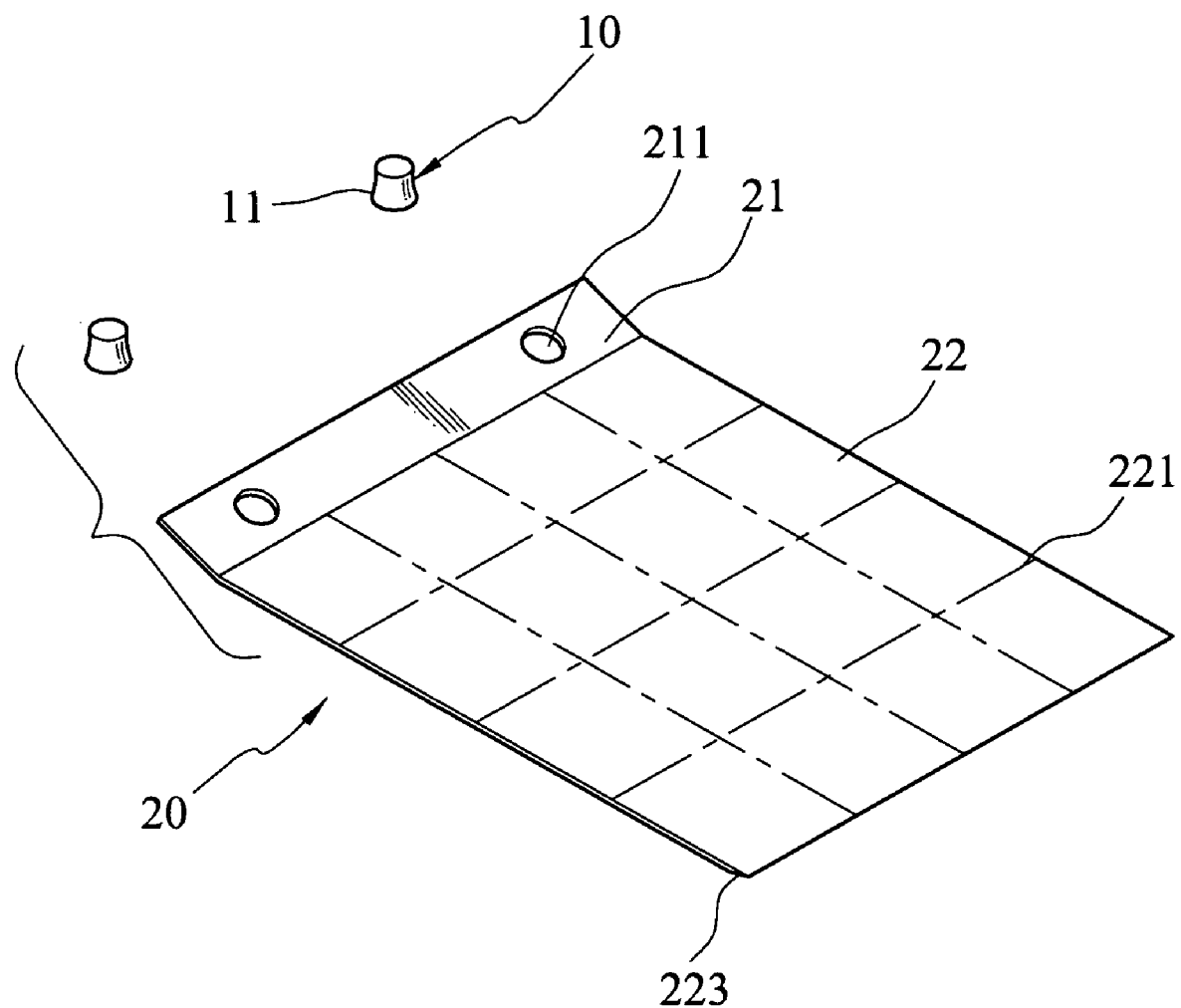
FIG. 1 is an exploded view of the invention.
Figure 2:
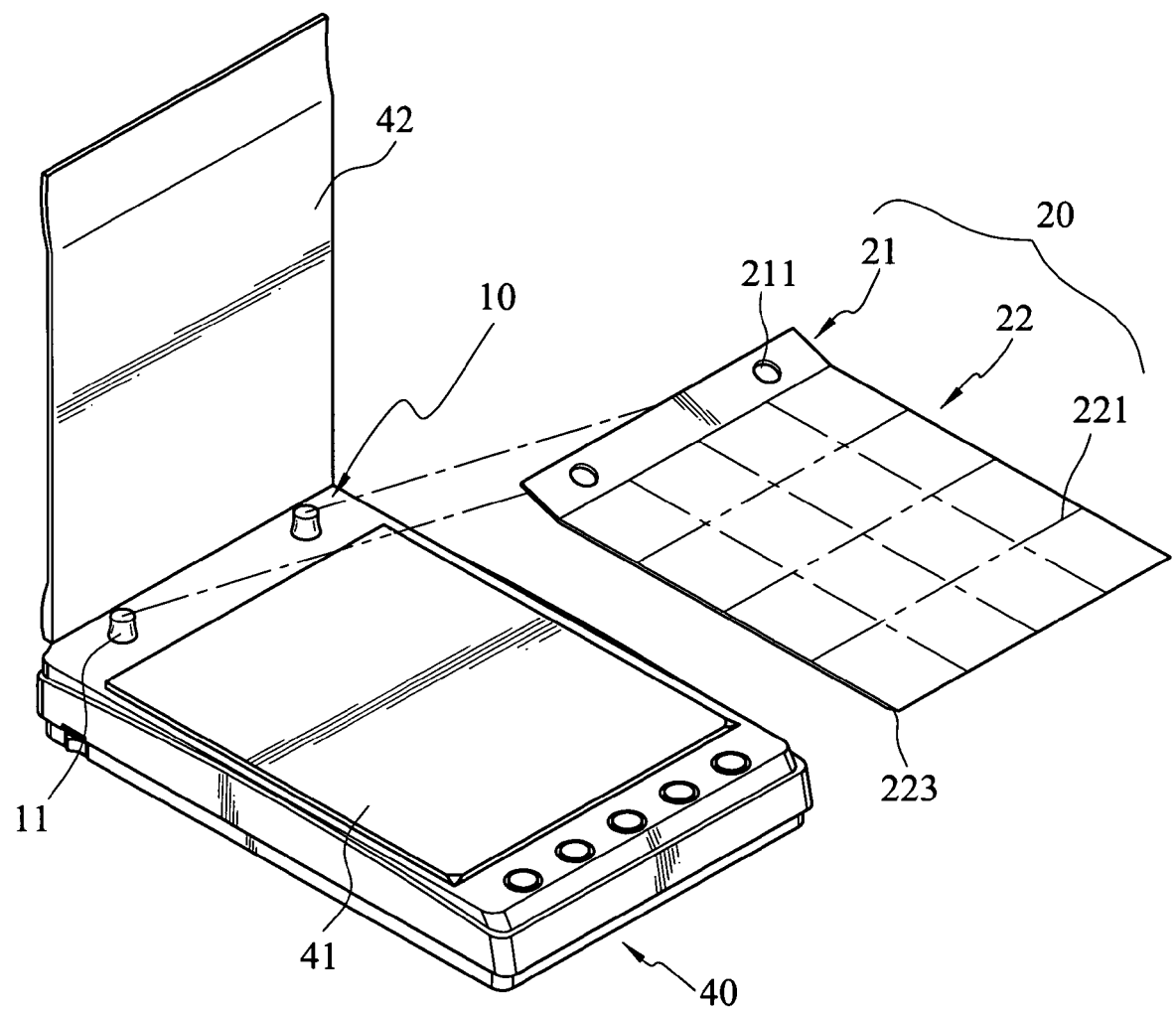
FIG. 2 is a schematic view of the invention adopted for use on a scanner.

Referring to FIGS. 1 and 2, the document fixing apparatus according to the invention includes a coupling member 10 and an anchor member 20. The coupling member 10 is located on one end of a glass surface 41 of a scanner 40. It is made from a compressible and pliable gum type material and has a neck opening 11 on a desired location.

The anchor member 20 includes a bended side 21 and a depressing plate 22. The bended side 21 is made of a hard gum type material that has holes 211 corresponding to and engagable with the coupling member 10 which is rest on the edge of the glass surface 41 of the scanner 40. So the holes 211 can loop the coupling member 10. The depressing plate 22 is made of a pliable and transparent gum type material to rest on the glass surface 41 after the holes 211 have been engaged with the coupling member 10. After a scanned document 30 (referring to FIGS. 4A, 4B and 4C) has been placed on the glass surface 41 of the scanner 40, the depressing plate 22 may press down on the scanned document 30 to anchor the scanned document 30 on the glass surface 41 before the lid 42 of the scanner 40 covers the glass surface 41, so that the scanned document 30 does not move or skew when the lid 42 is opened or closed over the glass surface 41. Moreover, the scanned document 30 is evenly compressed, resulting in an even scan image and improved scanning quality.

The depressing plate 22 is made of a pliable and transparent gum type material that does not negatively effect document 30 scanning. It may be easily replaced when aged or worn. Replacement is simple, convenient and inexpensive.

The depressing plate 22 may also have scanning alignment lines 221 formed thereon to align the scanning position of the scanned document 30. The alignment lines may be general grid lines to facilitate positioning of the scanned document 30 on the glass surface 41, thus reducing scan test time and producing scan images without skewing. The depressing plate 22 has a lifting end 223 opposite to the bended side 21. The lifting end 223 has a slant surface tilted toward the bended side 21 in a direction that is from a place where is remote from the glass surface 41, toward a place where is close to the glass surface 41. Thus, the lifting end 223 helps to facilitate lifting of the depressing plate 22.

In other words, the anchor member 20 has one end engaged with the coupling member 10 and corresponding to the glass surface 41. When it is lifted from the glass surface 41, the scanned document 30 may be placed on the glass surface 41, and the depressing plate 22 may be dropped to rest on the scanned document 30.

Figure 3:
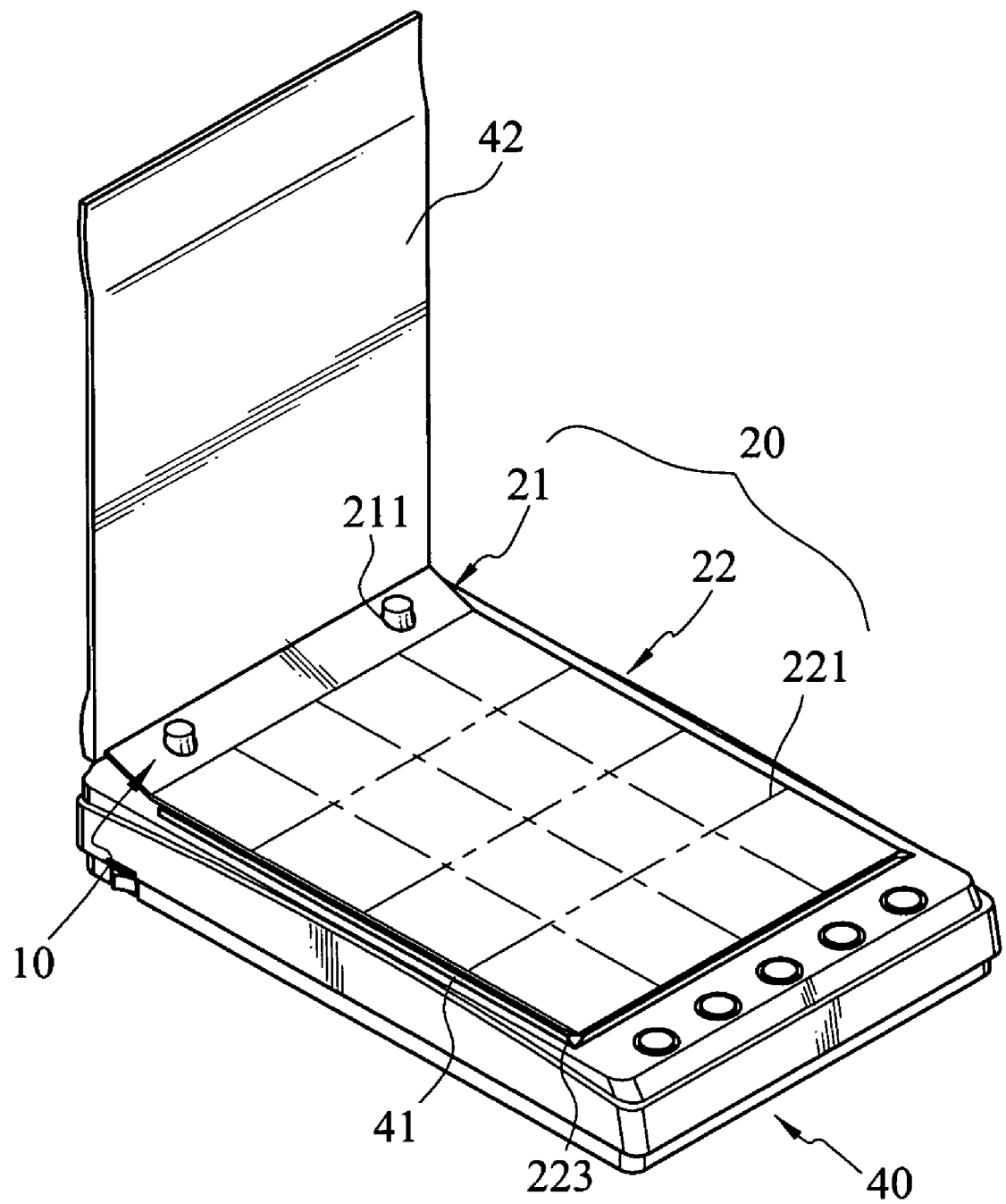
FIG. 3 is a schematic view of the invention in an assembly condition.

Refer to FIG. 3 for assembly of the invention. First, engage the holes 211 of the bended side 21 of the anchor member 20 with the coupling member 10. As the bended side 21 is made of a hard gum type material while the coupling member 10 is made of a pliable gum type material, the holes 211 may be engaged with the pliable coupling member 10 and squeezed to couple with the neck opening 11, so that the bended side 21 remains on one end of the glass surface 41 after assembly to enable the depressing plate 22 to rest on the glass surface 41 of the scanner 40.

Figure 4A:
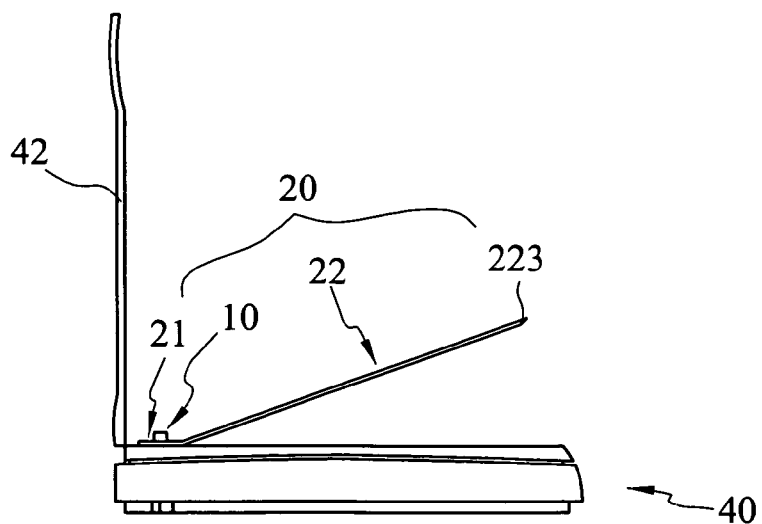
FIGS. 4A, 4B and 4C are schematic views of the invention in operating conditions.
Figure 4B:
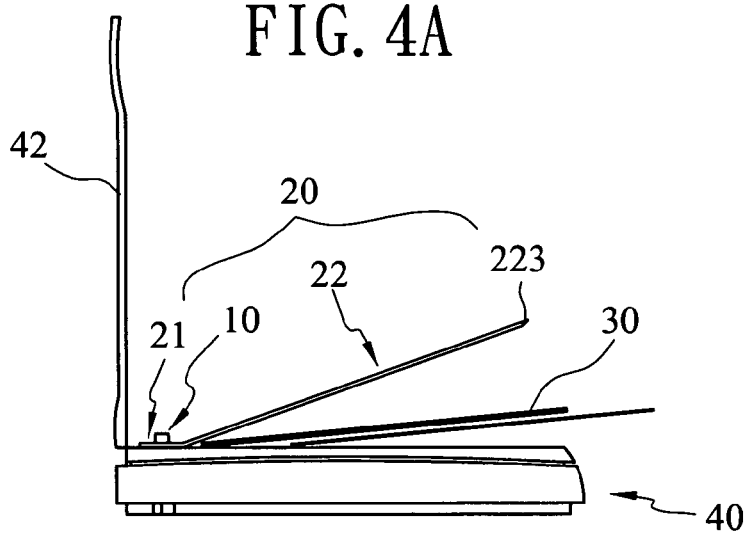
Figure 4C:
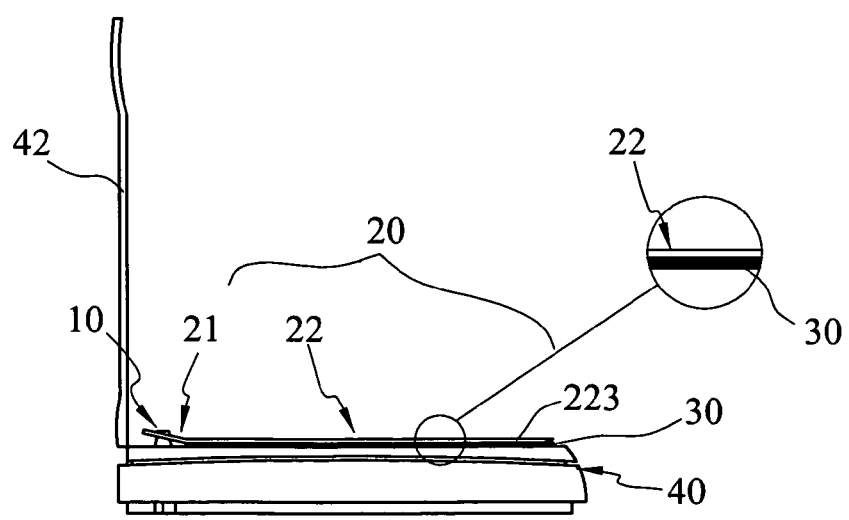

When placing the scanned document 30 on the scanner 40, first open the lid 42 of the scanner 40. Referring to FIGS. 4A, 4B and 4C, grasp the lifting end 223 of the depressing plate 22 of the anchor member 20. As the holes 211 are engaged with the coupling member 10 and the bended side 21 is attached to one end of the glass surface 41, only the depressing plate 22 is lifted, and the scanned document 30 may be aligned with the alignment lines 221 and placed in a desired scanning position. Alignment is easy even if the scanning content is not located on the border. Therefore a great deal of scan test time may be saved and skewed scan images may be prevented.

Next, place the depressing plate 22 on the scanned document 30 to anchor the scanned document 30 on the glass surface 41 of the scanner 40, and evenly compress the scanned document 30. Then cover the glass surface 41 with the lid 42, and the scanned document 30 is compressed by the depressing plate 22 without moving or fluttering. Execute scanning operation to get an even and high quality image. After the scanning operation is finished, lift the lid 42 from the glass surface 41. The scanned document 30 still rests under the depressing plate 22 without moving or fluttering.

Figure 5A:
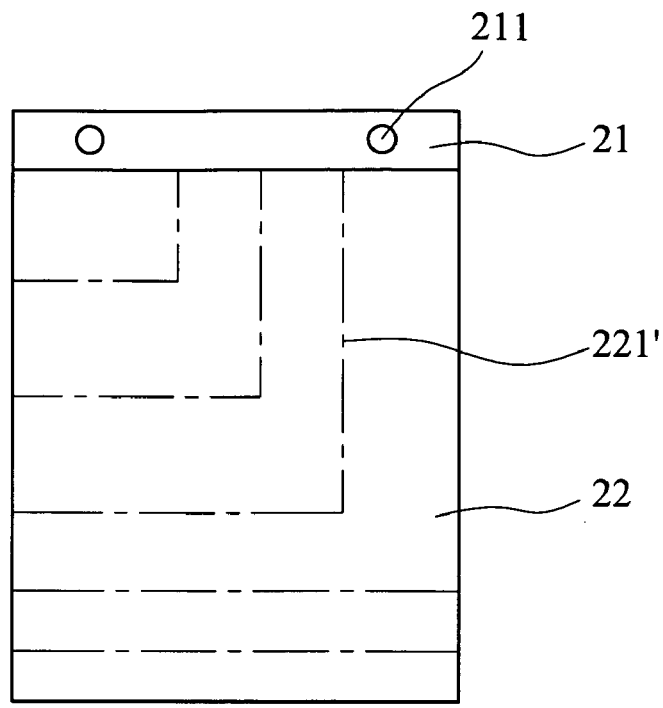
FIGS. 5A and 5B are schematic views of various alignment lines of the depressing plate of the invention.
Figure 5B:
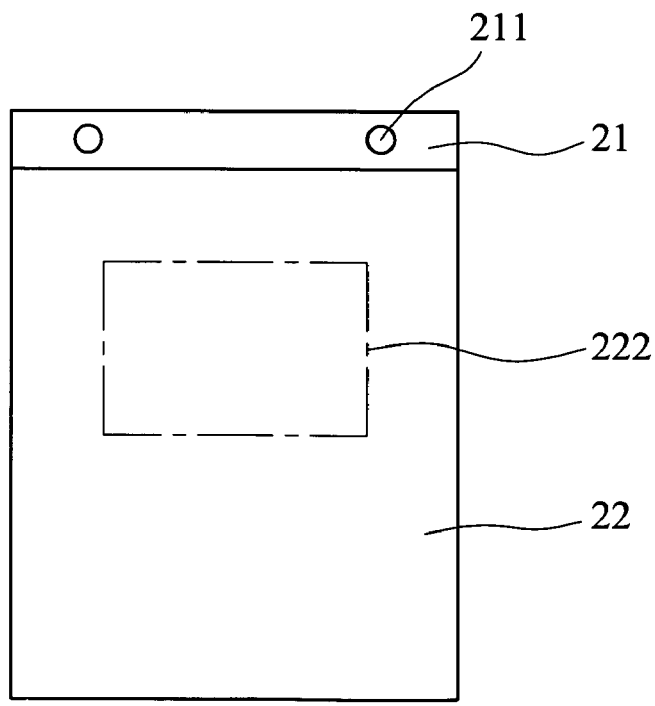

As shown in FIG. 1, the alignment lines 221 can provide alignment for many scanned document 30 positions. Of course, the alignment lines 221 may be formed on the depressing plate 22 in many ways. FIGS. 5A and 5B show a few of embodiments of the alignment lines. One example is to print varying alignment lines 221' on the depressing plate 22 for different sizes of scanned documents 30. Another example is to print a specific scan zone 222 where the scanned document 30 may be positioned to scan specifically on that zone as desired.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An object fixing apparatus for a business machine having a transparent surface, the apparatus comprising:
   a coupling member located adjacent to the transparent surface; and
   an anchor member engaged with the coupling member and comprising an angled portion having a first rigidity and a depressing plate having a second rigidity, wherein the first rigidity is greater than the second rigidity, the depressing plate being connected to the angled portion, the angled portion having a hole configured to engage the coupling member;
   wherein the anchor member is configured to move between a first position in which the anchor member is separated from the transparent surface and a second position in which the anchor member is configured to contact the transparent surface.

2. The apparatus of claim 1 wherein the coupling member comprises a flexible material.

3. The apparatus of claim 1 wherein the coupling member comprises a neck.

4. The apparatus of claim 1 wherein the angled portion is more rigid than the coupling member.

5. The apparatus of claim 1 wherein the depressing plate comprises a transparent material.

6. The apparatus of claim 5 wherein the depressing plate has a plurality of scan alignment lines thereon.

7. The apparatus of claim 6 wherein the alignment lines comprise a scan zone.

8. The apparatus of claim 1 wherein the depressing plate has a lifting portion comprising a slanted surface tilted away from the transparent surface.

9. A document fixing apparatus for a business machine having a transparent copy surface and a lid, the apparatus comprising:
   a coupling member comprising at least one protrusion extending from the transparent copy surface; and
   an anchor member comprising a first, bended portion having a first rigidity, and a second, flexible portion having a second rigidity, the first rigidity being greater than the second rigidity, the anchor member having at least one hole through which the at least one protrusion extends, the anchor member being configured to move between a first position in which the anchor member is separated from the transparent copy surface and a second position in which the anchor member is configured to be positioned on the transparent copy surface, wherein the lid is configured to press the anchor member onto the transparent copy surface when the lid is in a closed position.

10. The document fixing apparatus of claim 9 wherein the coupling member comprises a conical protrusion.

11. The document fixing apparatus of claim 9 wherein the coupling member comprises a neck.

12. The document fixing apparatus of claim 9 wherein the coupling member comprises at least two protrusions.

13. The document fixing apparatus of claim 9 wherein the business machine comprises at least one of a copier or a scanner.

14. The document fixing apparatus of claim 9 wherein the second, flexible portion of the anchor member comprises a transparent material, and wherein the second, flexible portion of the anchor member comprises a plurality of L-shaped alignment lines.

15. The document fixing apparatus of claim 9 wherein the anchor member comprises a scan zone, and the business machine is configured to scan a portion of a document positioned within the scan zone.

16. An imaging apparatus, comprising:
a transparent surface configured to receive a document thereon;
a lid;
at least one cylindrical protrusion adjacent to the transparent surface;
a document fixation member comprising:
a depressing plate having a first rigidity; and
a bended portion having a second rigidity, the first rigidity being greater than the second rigidity, the bended portion being flexibly hinged to the depressing plate,
wherein the bended portion has at least one opening configured to receive the cylindrical protrusion, and the depressing plate is configured to be lifted from the transparent surface, and wherein the document fixation member is configured to contact the transparent surface while the lid is in an open position.

17. The imaging apparatus of claim 16 wherein the document imaging apparatus comprises at least one of a copier or a scanner.

18. The imaging apparatus of claim 16 wherein the document fixation member further comprises a lifting edge slanted away from the transparent surface.

19. The imaging apparatus of claim 16 wherein the depressing plate comprises a transparent material and a plurality of alignment lines.

20. The imaging apparatus of claim 16 wherein the depressing plate comprises a scan zone comprising a transparent material.

21. The imaging apparatus of claim 16 wherein the document fixation member comprises a transparent material.

* * * * *